(12) United States Patent
Shachar et al.

(10) Patent No.: US 12,393,741 B2
(45) Date of Patent: Aug. 19, 2025

(54) BIOS-BASED DEVICE PROTECTION USING DETECTION AND MITIGATION OF MODIFICATIONS TO A PROTECTED STORAGE REGION

(71) Applicant: Dell Products L.P., Round Rock, TX (US)

(72) Inventors: Tomer Shachar, Beer Sheva (IL); Yevgeni Gehtman, Modi'in (IL); Ophir Buchman, Raanana (IL)

(73) Assignee: Dell Products L.P., Round Rock, TX (US)

( * ) Notice: Subject to any disclaimer, the term of this patent is extended or adjusted under 35 U.S.C. 154(b) by 263 days.

(21) Appl. No.: 18/109,603

(22) Filed: Feb. 14, 2023

(65) Prior Publication Data

US 2024/0273242 A1    Aug. 15, 2024

(51) Int. Cl.
*G06F 21/78* (2013.01)
*G06F 9/4401* (2018.01)
*G06F 21/64* (2013.01)

(52) U.S. Cl.
CPC ............ *G06F 21/78* (2013.01); *G06F 9/4401* (2013.01); *G06F 21/64* (2013.01)

(58) Field of Classification Search
CPC ........ G06F 21/78; G06F 9/4401; G06F 21/64; G06F 21/575
See application file for complete search history.

(56) References Cited

U.S. PATENT DOCUMENTS

| | | | | |
|---|---|---|---|---|
| 2009/0240717 | A1* | 9/2009 | Mimatsu | G06F 11/0727 |
| 2018/0181762 | A1* | 6/2018 | Poornachandran | G06F 21/575 |
| 2020/0364342 | A1* | 11/2020 | Martinez | G06F 21/575 |
| 2022/0038532 | A1* | 2/2022 | Horigane | H04L 67/60 |
| 2024/0184932 | A1* | 6/2024 | Schaffner | G06F 21/64 |

OTHER PUBLICATIONS

"Store Business-Critical Blob Data with Immutable Storage"; https://learn.microsoft.com/en-us/azure/storage/blobs/immutable-storage-overview; Sep. 20, 2022.

(Continued)

*Primary Examiner* — Mohammad W Reza
(74) *Attorney, Agent, or Firm* — Ryan, Mason & Lewis, LLP

(57) ABSTRACT

Techniques are provided for device protection using basic input/output system (BIOS)-based detection and mitigation of modifications to a protected storage region. One method comprises obtaining, by a BIOS of a processing device, during a first execution of a boot process, an indication of a protected storage region of a storage device; storing, by the BIOS, during the first execution of the boot process, content of the protected storage region in a backup storage region of a persistent storage device associated with the BIOS; evaluating, by the BIOS, during a subsequent boot process, content of the protected storage region to detect changes in the content of the protected storage region; and initiating an automated action responsive to the detected changes in the content of the protected storage region, wherein the automated action comprises notifying a user of the detected changes in the content of the protected storage region.

20 Claims, 8 Drawing Sheets

(56) References Cited

OTHER PUBLICATIONS

"Secure Enclave"; Apple Platform Security; https://support.apple.com/guide/security/secure-enclave-sec59b0b31ff/ web; downloaded on Feb. 13, 2023.
"Immutable Storage: What it is and Why Your Business Needs It"; https://www.helixstorm.com/blog/what-is-immutable-storage-and-why-your-business-needs-it/ (2022).
"HP Sure Start Whitepaper, Firmware Security and Resilience"; Technical Whitepaper; Jun. 2021.

* cited by examiner

BIOS-BASED DEVICE PROTECTION USING DETECTION AND MITIGATION OF MODIFICATIONS TO A PROTECTED STORAGE REGION

FIELD

The field relates generally to information processing systems, and more particularly to the protection of devices in such information processing systems.

BACKGROUND

Computing devices are typically configured to incorporate security functionality to protect such devices from malicious activity. For example, it may be desirable to prevent suspicious computer operations unless they are implemented by a legitimate and authorized user. Role-based access control (RBAC) techniques may be employed to restrict access to devices or network resources based on the roles of individual users within an organization. RBAC techniques typically allow users to access only the information and other resources needed for their jobs and prevent users from accessing additional resources. RBAC techniques, however, are vulnerable to various types of attacks, such as password theft and/or session hijacking.

A need exists for improved techniques for protecting devices from suspicious and/or unauthorized computer operations.

SUMMARY

In one embodiment, a method comprises obtaining, by a basic input/output system (BIOS) of at least one processing device, during a first execution of a boot process, an indication of a protected storage region of at least one storage device associated with the at least one processing device; storing, by the BIOS, during the first execution of the boot process, content of the protected storage region in a backup storage region of a persistent storage device associated with the BIOS; evaluating, by the BIOS, during a subsequent execution of the boot process, content of the protected storage region to detect one or more changes in the content of the protected storage region; and initiating at least one automated action responsive to the one or more detected changes in the content of the protected storage region, wherein the at least one automated action comprises notifying at least one user of the one or more detected changes in the content of the protected storage region.

In some embodiments, the evaluating the content of the protected storage region comprises comparing one or more of: (i) the content of the protected storage region to the content of the backup storage region and (ii) a first hash value of the content of the protected storage region to a second hash value of the content of the backup storage region.

In one or more embodiments, the at least one automated action further comprises restoring the content of the backup storage region to the protected storage region responsive to the at least one user indicating that the one or more detected changes in the content of the protected storage region were not approved. The at least one automated action may further comprise allowing an operating system of the at least one processing device to load responsive to the at least one user indicating that the one or more detected changes in the content of the protected storage region were approved. In addition, the at least one automated action may further comprise updating the content of the backup storage region with the content of the protected storage region responsive to the at least one user indicating that the one or more detected changes in the content of the protected storage region were approved. The at least one automated action may also comprise allowing an operating system of the at least one processing device to load responsive to the updating of the content of the backup storage region with the content of the protected storage region.

Other illustrative embodiments include, without limitation, apparatus, systems, methods and computer program products comprising processor-readable storage media.

DETAILED DESCRIPTION

Figure 1:
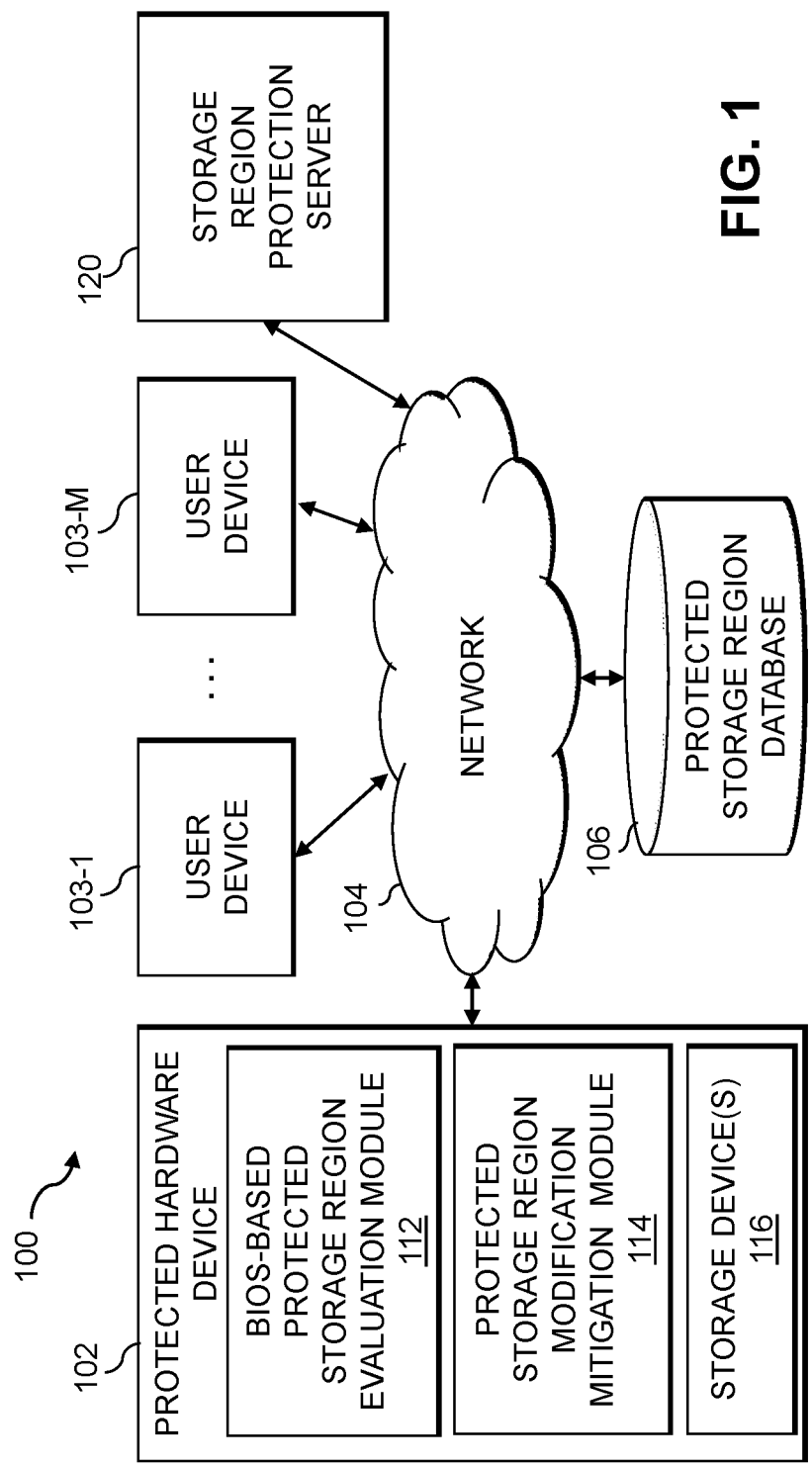
FIG. 1 illustrates an information processing system configured for device protection using BIOS-based detection and mitigation of modifications to a protected storage region in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for device protection using BIOS-based detection and mitigation of modifications to a protected storage region.

In one or more embodiments, the disclosed BIOS-based storage region protection techniques allow a user to designate portions of a storage device as a protected storage region. In at least some embodiments, the contents of the protected storage region are stored in a backup storage region and the BIOS of a processing device evaluates the protected storage region for any changes to the contents of the protected storage region since a prior execution of a boot process. In response to a detected change to the contents of the protected storage region, a user is notified of the change and must approve the change. The contents of the backup storage region can be copied to the protected storage region when the user does not approve the change. The protected storage region may be, for example, a small portion of a larger storage area.

In some embodiments, the disclosed BIOS-based storage region protection techniques can be employed to protect, for example, boot metadata (e.g., boot records and partition tables), filesystem metadata, operating system metadata, metadata, basic input/output system metadata and/or other designated protected information stored by an operating system on a storage device of a protected device. One or more aspects of the disclosure recognize that malicious, unauthorized or defective software may attempt to alter the designated protected information (e.g., boot and/or filesystem metadata) of a given device, potentially causing confidentiality, integrity and/or availability problems with respect to the given device (e.g., when the given device cannot access the necessary boot information during a boot process). The boot information associated with a given device, for example, typically changes only when there is an update of the operating system of the given device. When the storage area storing such boot information and other protected information is designated as a protected storage region, a user can approve each detected change to the protected storage region to ensure that the requested change is not a malicious, unauthorized or defective change.

Among other benefits, the disclosed BIOS-based storage region protection techniques protect devices and/or the data associated with such devices from unauthorized, erroneous and/or malicious operations, such as attempts to alter the contents of a designated protected storage region. For example, an authorized user may inadvertently store a random user file in the protected storage region, potentially overwriting the protected contents of the protected storage region. Such an error can be detected and corrected using the disclosed BIOS-based storage region protection techniques.

FIG. 1 shows a computer network (also referred to herein as an information processing system) 100 configured in accordance with an illustrative embodiment. The computer network 100 comprises a plurality of user devices 103-1 through 103-M, collectively referred to herein as user devices 103. The user devices 103 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is one or more protected hardware devices 102, one or more storage region protection servers 120 and one or more protected storage region databases 106, discussed below.

The protected hardware devices 102 may comprise edge devices, host devices and other devices that execute user commands. One or more aspects of the disclosure recognize that edge devices, for example, are attractive targets for an attack and often comprise critical infrastructure that may require an evaluation of whether to execute certain commands and/or operations and/or whether the contents of designated protected storage regions have been altered. Edge devices may be stored, for example, in a physical location that may not be properly secured. An attacker may be able to access a perimeter of a location of the edge device (or another adjacent or nearby location that is within range of the edge device).

The user devices 103 may comprise, for example, host devices and/or devices such as mobile telephones, laptop computers, tablet computers, desktop computers or other types of computing devices. Such devices are examples of what are more generally referred to herein as "processing devices" which may be protected using the disclosed device protection techniques. Some of these processing devices are also generally referred to herein as "computers." The user devices 103 may comprise a network client that includes networking capabilities such as ethernet, Wi-Fi, etc. When the user devices 103 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices.

The user devices 103 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

It is to be appreciated that the term "user" in this context and elsewhere herein is intended to be broadly construed so as to encompass, for example, human, hardware, software or firmware entities (including services), as well as various combinations of such entities. Compute and/or storage services may be provided for users under a Platform-as-a-Service (PaaS) model, a Storage-as-a-Service (STaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

As shown in FIG. 1, an exemplary protected hardware device 102 may comprise a BIOS-based protected storage region evaluation module 112, a protected storage region modification mitigation module 114 and one or more storage devices 116 (e.g., one or more solid-state drives (SSDs) and/or one or more hard disk drives (HDDs)). In some embodiments, the BIOS-based protected storage region evaluation module 112 automatically detects a prior modification to a protected storage region during a boot process, as discussed further below in conjunction with FIGS. 3 through 5. The protected storage region modification mitigation module 114 may request a user approval of a detected change in the contents of the protected storage region and can copy the contents of the backup storage region to the protected storage region when the user does not approve the detected change. In some embodiments, any changes to data stored in the protected storage region requires a designated level of approval.

It is to be appreciated that this particular arrangement of elements 112, 114, 116 illustrated in the protected hardware device 102 of the FIG. 1 embodiment is presented by way of example only, and alternative arrangements can be used in other embodiments. For example, the functionality associated with elements 112, 114, 116 in other embodiments can be combined into a single element, or separated across a larger number of elements. As another example, multiple distinct processors can be used to implement different ones of elements 112, 114 and 116, or portions thereof.

At least portions of elements 112, 114, 116 may be implemented at least in part in the form of software that is stored in memory and executed by a processor. An exemplary process utilizing elements 112, 114, 116 of the protected hardware device 102 in computer network 100 will be described in more detail with reference to FIGS. 4 through 6, for example.

Other protected hardware devices 102 (not shown in FIG. 1) are assumed to be configured in a manner similar to that shown for protected hardware device 102 in the figure.

The storage region protection server 120 may be implemented, for example, on the cloud, such as a private cloud, or on the premises of an enterprise or another entity, as discussed further below in conjunction with FIG. 3. In some embodiments, the storage region protection server 120, or portions thereof, may be implemented as part of a host device. The storage region protection server 120 may implement server-side functionality associated with the disclosed BIOS-based storage region protection techniques, such as, for example, implementing policies for designating storage areas as protected storage regions and default storage ranges to be automatically designated as a protected storage region.

Additionally, the protected hardware device 102 and/or the storage region protection server 120 can have an associated protected storage region database 106 configured to store, for example, a set of policies and/or default storage ranges for designating protected storage regions and/or information related to various devices, such as one or more protected hardware devices 102, such as protected storage regions, device locations, network address assignments and performance data. The protected storage region database 106 may be maintained, for example, by the storage region protection server 120 and accessible by one or more protected hardware devices 102.

At least portions of the protected storage region database 106 configured to store, for example, the policies and/or default storage ranges for designating protected storage regions may be implemented, for example, using a vault or another protected storage provided by an operating system of one or more of the protected hardware devices 102, user devices 103 and/or storage region protection servers 120. In some embodiments, any changes to data stored in the protected storage region requires a designated level of approval.

The protected storage region database 106 in the present embodiment is implemented using one or more storage systems associated with the storage region protection server 120. Such storage systems can comprise any of a variety of different types of storage such as, network-attached storage (NAS), storage area networks (SANs), direct-attached storage (DAS) and distributed DAS, as well as combinations of these and other storage types, including software-defined storage.

The one or more protected hardware devices 102, user devices 103 and/or storage region protection servers 120 may be implemented on a common processing platform, or on separate processing platforms. The one or more protected hardware devices 102 and user devices 103 may be configured to interact over the network 104 in at least some embodiments with the storage region protection server 120.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the user devices 103 and the storage system to reside in different data centers. Numerous other distributed implementations of the host devices and the storage system are possible.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the one or more protected hardware devices 102, user devices 103 and/or storage region protection servers 120 can be one or more input-output devices (not shown), which illustratively comprise keyboards, displays or other types of input-output devices in any combination. Such input-output devices can be used, for example, to support one or more user interfaces to the storage region protection server 120, as well as to support communication between the storage region protection server 120 and other related systems and devices not explicitly shown.

The one or more protected hardware devices 102, user devices 103 and/or storage region protection servers 120 in the FIG. 1 embodiment are assumed to be implemented using at least one processing device. Each such processing device generally comprises at least one processor and an associated memory and implements one or more functional modules for controlling certain features of the respective device.

More particularly, the one or more protected hardware devices 102, user devices 103 and/or storage region protection servers 120 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

The network interface allows the one or more protected hardware devices 102, user devices 103 and/or storage region protection servers 120 to communicate in some embodiments over the network 104 with each other (as well as one or more other networked devices), and illustratively comprises one or more conventional transceivers.

It is to be understood that the particular set of elements shown in FIG. 1 for device protection using BIOS-based detection and mitigation of modifications to a protected storage region is presented by way of illustrative example only, and in other embodiments additional or alternative elements may be used. Thus, another embodiment includes additional or alternative systems, devices and other network entities, as well as different arrangements of modules and other components.

Figure 2:
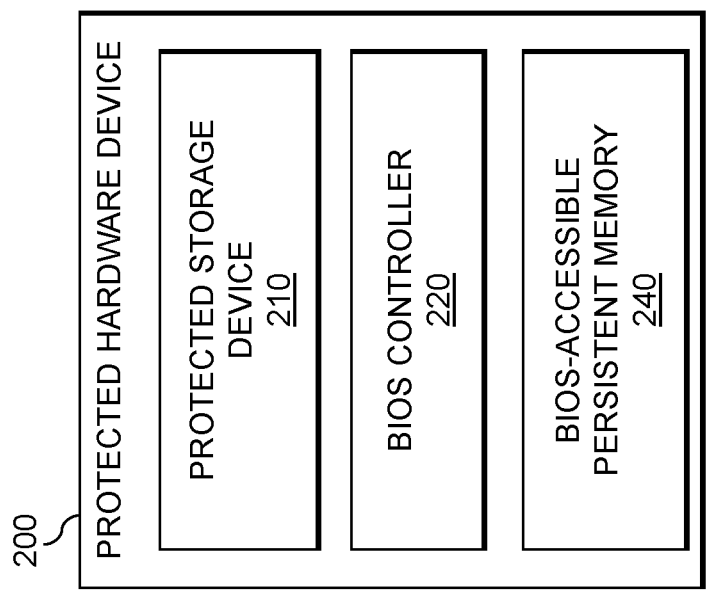
FIG. 2 illustrates the protected hardware device of FIG. 1 in further detail in accordance with an illustrative embodiment.

FIG. 2 illustrates a protected hardware device 200 in accordance with an illustrative embodiment. In the example of FIG. 2, the protected hardware device 200 comprises one or more protected storage devices 210, a BIOS controller 220, and a BIOS-accessible persistent memory 240. The BIOS controller 220 may be implemented, for example, as a BIOS (Basic Input Output System) chip, an Extensible Firmware Interface (EFI) BIOS chip, and/or a Unified Extensible Firmware Interface (UEFI) BIOS chip. It is noted that multiple BIOS controllers 220 can be present on a given protected hardware device 200. The BIOS controller 220 typically initializes hardware during a boot process for a given device, and provides runtime services for the operating system and programs of the given device. A malicious modification of the BIOS or metadata associated with the BIOS can cause a denial of service (e.g., if the BIOS or the BIOS metadata is corrupted) or permit an unauthorized operating system from being loaded (sometimes referred to as a back door that may cause unpredictable damage).

As discussed further below, at least a portion of the BIOS-accessible persistent memory 240 serves as a backup storage region for portions of the protected storage devices 210 designated as a protected storage region.

In one or more embodiments, the BIOS controller 220 performs the BIOS-based storage region protection techniques described herein. In particular, in some embodiments, the BIOS controller 220 (i) stores the contents of a designated protected storage region of the one or more protected storage devices 210 in a backup storage region of the BIOS-accessible persistent memory 240; (ii) evaluates the protected storage region for any changes to the contents of the protected storage region; (iii) notifies a user of a detected change to the contents of the protected storage region; and (iv) copies the contents of the backup storage region to the protected storage region when the user does not approve the change.

Figure 3:
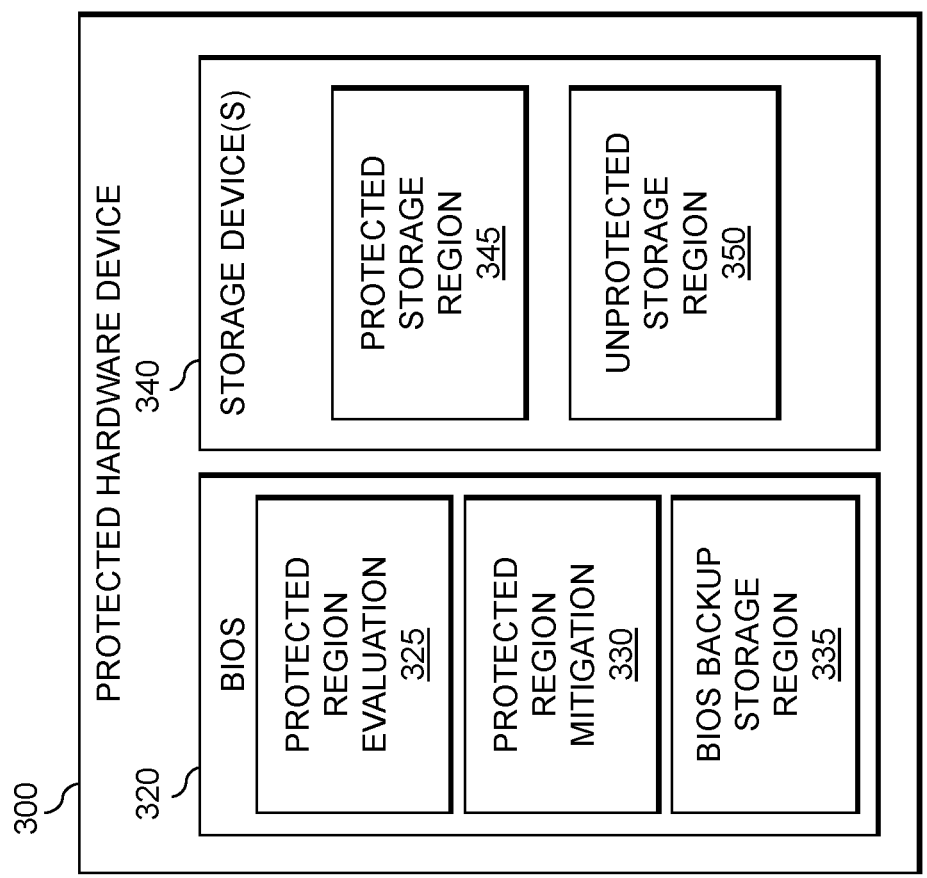
FIG. 3 illustrates a protected hardware device configured to employ BIOS-based detection and mitigation of modifications to a protected storage region in accordance with an illustrative embodiment.

FIG. 3 illustrates a protected hardware device 300 configured to employ BIOS-based detection and mitigation of modifications to a protected storage region in accordance with an illustrative embodiment. In the example of FIG. 3, the protected hardware device 300 comprises a BIOS 320 and one or more storage devices 340. The BIOS 320 may be installed, for example, on the BIOS controller of the protected hardware device 300. The BIOS 320 performs the BIOS-based storage region protection techniques described herein and comprises a protected region evaluation function 325 and a protected region mitigation function 330. In addition, the BIOS 320 comprises a BIOS backup storage region 335 (e.g., the BIOS-accessible persistent memory 240 of FIG. 2) to serve as a backup storage region for portions of the storage devices 340 designated as a protected storage region 345.

The one or more storage devices 340 comprise a protected storage region 345 and an unprotected storage region 350. In some embodiments, the BIOS backup storage region 335 of a BIOS 320 protects the protected storage region 345 of the storage device 340.

In some embodiments, the protected region evaluation function 325 of the BIOS 320 (i) stores the contents of the protected storage region 345 of the one or more protected storage devices 340 in the BIOS backup storage region 335 and (ii) evaluates the content of the protected storage region 345 for any changes to the contents of the protected storage region 345. The storage of the contents of the protected storage region 345 in the BIOS backup storage region 335 by the protected region evaluation function 325 of the BIOS 320 may comprise taking a snapshot of the state of the protected storage region 345 by defining a range of storage, such as a list of address ranges (e.g., Logical Block Address (LBA) ranges) containing sensitive data, or other data to be protected, as the protected storage region 345; and backing up the data stored in the protected storage region 345 into the BIOS backup storage region 335.

The evaluating the content of the protected storage region 345 by the protected region evaluation function 325 may comprise: (i) comparing the contents of the protected storage region 345 to the content of the BIOS backup storage region 335 and/or (ii) comparing a first hash value of the contents of the protected storage region 345 to a second hash value of the contents of the BIOS backup storage region 335. The evaluation may be performed by the protected region evaluation function 325, for example, during a reboot of the protected hardware device 300. The protected region mitigation function 330 may notify a user of a detected change to the contents of the protected storage region 345; and/or copy the contents of the BIOS backup storage region 335 to the protected storage region 345 when the user does not approve the detected change. In addition, the protected region mitigation function 330 may update the content of the BIOS backup storage region 335 with the new content of the protected storage region 345 when the user indicates that the detected change in the content stored in the protected storage region 345 was approved.

Figure 4:
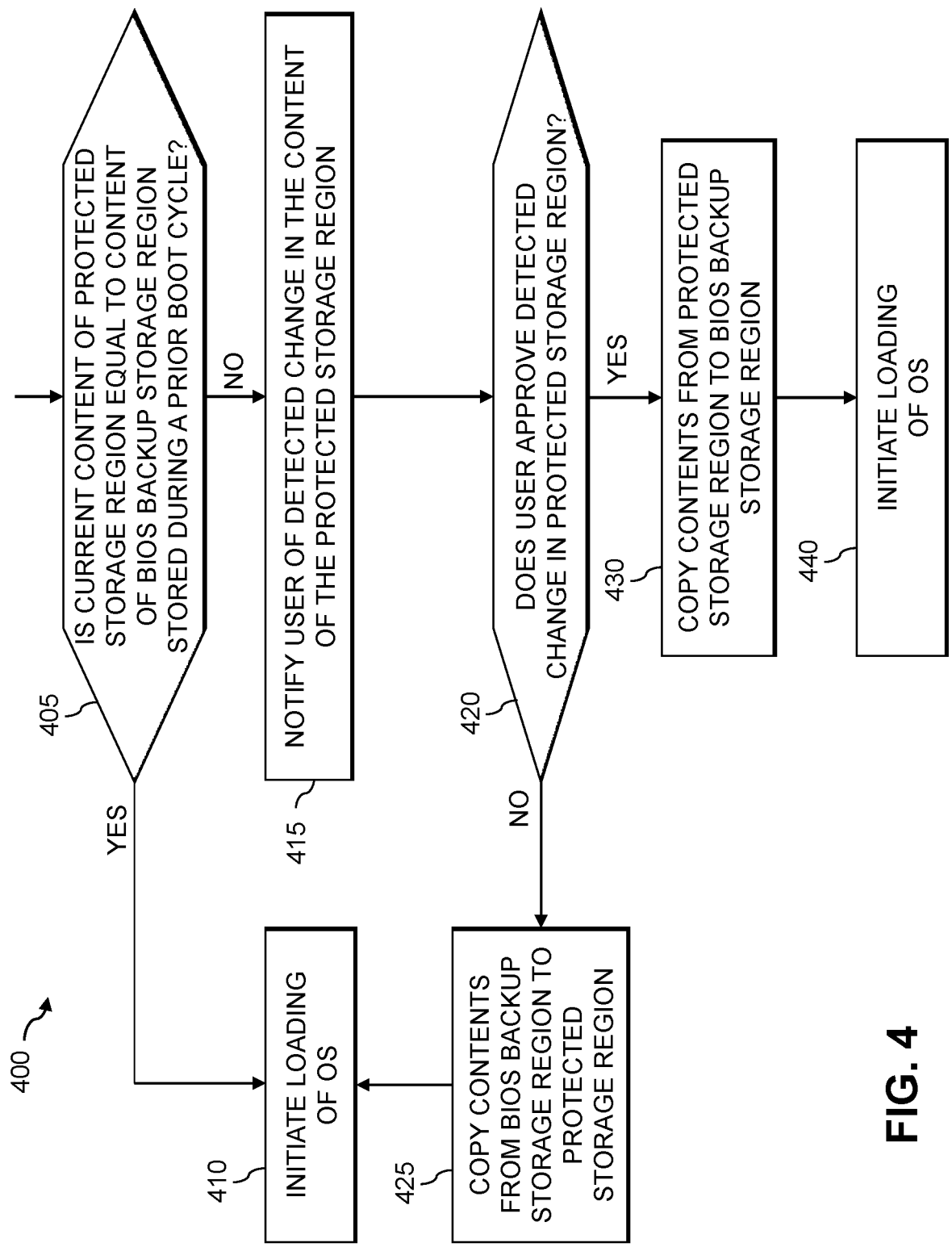
FIG. 4 is a flow chart illustrating an exemplary implementation of a process for device protection using BIOS-based detection and mitigation of modifications to a protected storage region in accordance with an illustrative embodiment.

FIG. 4 is a flow chart illustrating an exemplary implementation of a process 400 for device protection using BIOS-based detection and mitigation of modifications to a protected storage region in accordance with an illustrative embodiment. In some embodiments, the steps of the process 400 of FIG. 4 are performed by the protected region evaluation function 325 and/or the protected region mitigation function 330 of the BIOS 320 of FIG. 3 during a boot process.

In the example of FIG. 4, a test is performed in step 405 to determine if a current content of the protected storage region is equal to the content of the BIOS backup storage region stored during a prior boot cycle. If it is determined in step 405 that the current content of the protected storage region is equal to the content of the BIOS backup storage region stored during a prior boot cycle, then the process 400 initiates a loading of the operating system in step 410.

If, however, it is determined in step 405 that the current content of the protected storage region is not equal to the content of the BIOS backup storage region stored during a prior boot cycle, then the process 400 notifies a user of the detected change in the content of the protected storage region in step 415.

A further test is performed in step 420 to determine if the user approves the detected change in the protected storage region. If it is determined in step 420 that the user does not approve the detected change in the protected storage region, then the process 400 copies the contents from the BIOS backup storage region to the protected storage region in step 425, and then the process 400 initiates a loading of the operating system in step 410. In this manner, the contents of protected storage region can be reinstated, allowing a potentially defective operating system boot process to be restored to an operational state.

If, however, it is determined in step 420 that the user approves the detected change in the protected storage region, then the process 400 copies the contents from the protected storage region to the BIOS backup storage region in step 430, and then the process 400 initiates a loading of the operating system in step 440.

Figure 5:
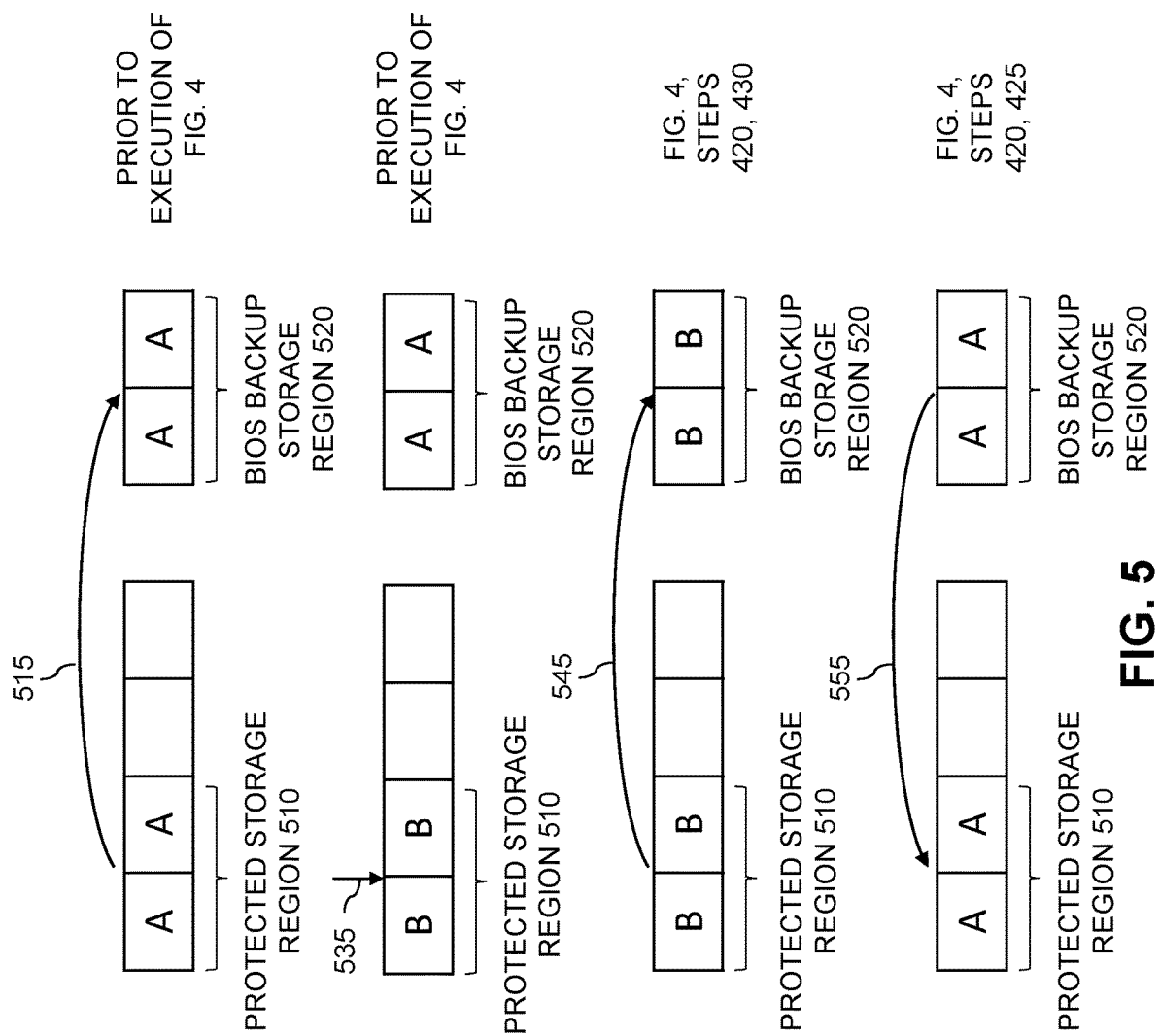
FIG. 5 illustrates a status of a protected storage region and a BIOS backup storage region with respect to a number of the steps in the flow chart of FIG. 4 in accordance with an illustrative embodiment.

FIG. 5 illustrates a status of a protected storage region 510 and a BIOS backup storage region 520 with respect to a number of the steps in the flow chart of FIG. 4 in accordance with an illustrative embodiment. In the example of FIG. 5, the contents ("AA") of the protected storage region 510 are copied 515 to the BIOS backup storage region 520 prior to the execution of FIG. 4. A write operation (as indicated by the arrow 535 in FIG. 5) is associated with one or more users performing one or more write operations to the protected storage region 510 prior to the execution of FIG. 4 that result in changing the content of the protected storage region from ("AA") to ("BB").

The contents ("BB") of the protected storage region 510 are copied 545 to the BIOS backup storage region 520 in conjunction with the user approving the detected change in steps 420 and 430 of FIG. 4. The contents ("AA") of the BIOS backup storage region 520 are copied 555 to the protected storage region 510 in conjunction with the user rejecting the detected change in steps 420 and 425 of FIG. 4.

Figure 6:
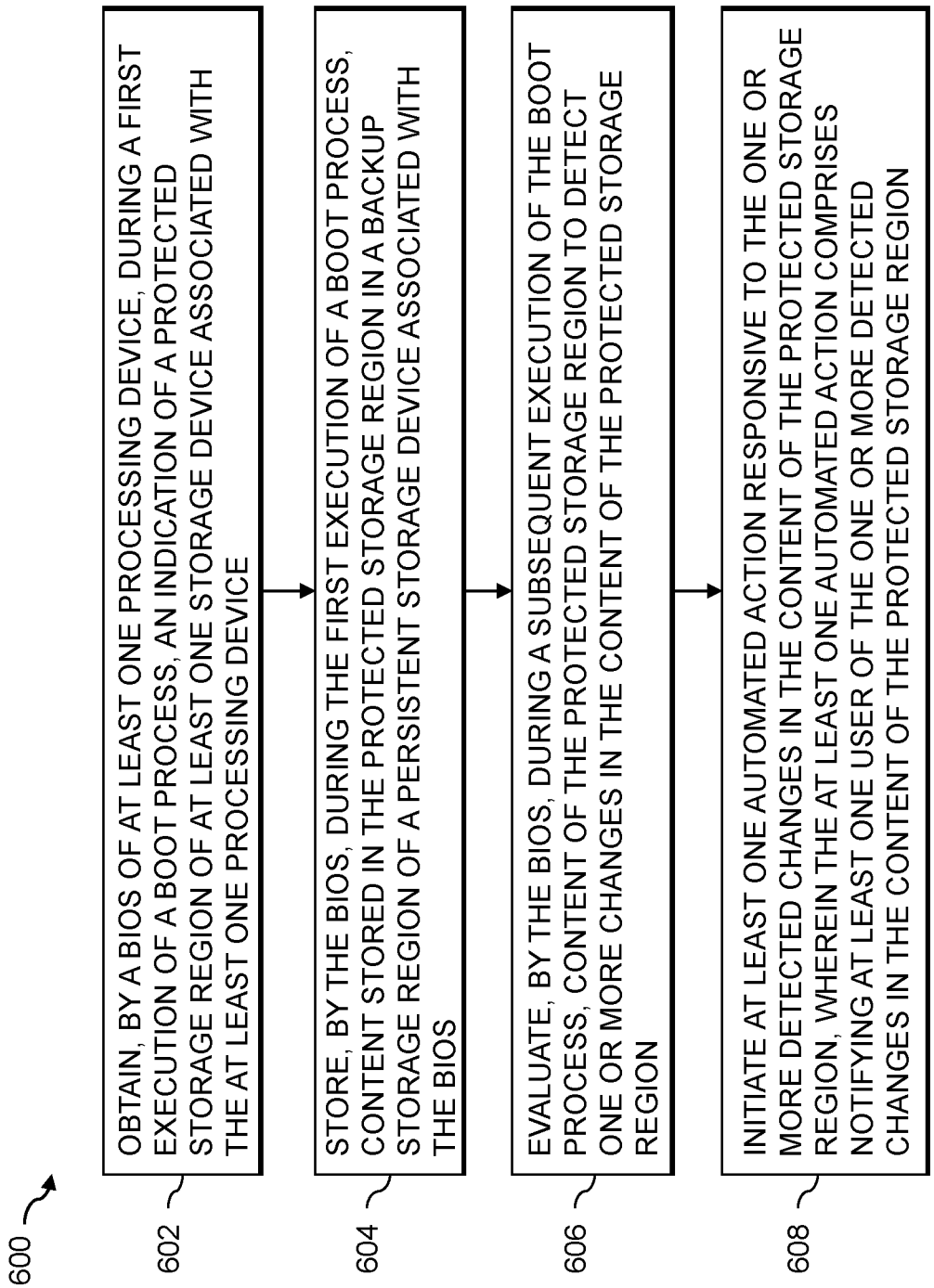
FIG. 6 is a flow chart illustrating an exemplary implementation of a process for device protection using BIOS-based detection and mitigation of modifications to a protected storage region in accordance with an illustrative embodiment.

FIG. 6 is a flow chart illustrating an exemplary implementation of a process 600 for device protection using BIOS-based detection and mitigation of modifications to a protected storage region in accordance with an illustrative embodiment. In the example of FIG. 6, the process 600 obtains, in step 602, by a BIOS of at least one processing device, during a first execution of a boot process, an indication of a protected storage region of at least one storage device associated with the at least one processing device.

In step 604, the BIOS stores, during the first execution of the boot process, content of the protected storage region in a backup storage region of a persistent storage device associated with the BIOS. In step 606, the BIOS evaluates, during a subsequent execution of the boot process, content of the protected storage region to detect one or more changes in the content of the protected storage region.

At least one automated action is initiated in step 608 responsive to the one or more detected changes in the content of the protected storage region, wherein the at least one automated action comprises notifying at least one user of the one or more detected changes in the content of the protected storage region.

In some embodiments, the evaluating the content of the protected storage region comprises comparing one or more of: (i) the content of the protected storage region to the content of the backup storage region and (ii) a first hash value of the content of the protected storage region to a second hash value of the content of the backup storage region.

In one or more embodiments, the at least one automated action further comprises restoring the content of the backup storage region to the protected storage region responsive to the at least one user indicating that the one or more detected changes in the content of the protected storage region were not approved. The at least one automated action may further comprise allowing an operating system of the at least one processing device to load responsive to the at least one user indicating that the one or more detected changes in the content of the protected storage region were approved. In addition, the at least one automated action may further comprise updating the content of the backup storage region with the content of the protected storage region responsive to the at least one user indicating that the one or more detected changes in the content of the protected storage region were approved. The at least one automated action may also comprise allowing an operating system of the at least one processing device to load responsive to the updating of the content of the backup storage region with the content of the protected storage region.

In at least one embodiment, the protected storage region stores one or more of: boot metadata, filesystem metadata, operating system metadata, BIOS metadata and/or designated protected information.

The particular processing operations and other network functionality described in conjunction with FIGS. 3 through 6, for example, are presented by way of illustrative example only, and should not be construed as limiting the scope of the disclosure in any way. Alternative embodiments can use other types of processing operations for device protection using BIOS-based detection and mitigation of modifications to a protected storage region. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

The disclosed techniques for device protection using BIOS-based detection and mitigation of modifications to a protected storage region can be employed, for example, to detect unauthorized changes to a protected storage region and to mitigate such detected unauthorized changes to the protected storage region by automatically performing one or more actions to mitigate an impact of any unauthorized changes to the protected storage region.

One or more embodiments of the disclosure provide improved methods, apparatus and computer program products for device protection using BIOS-based detection and mitigation of modifications to a protected storage region. The foregoing applications and associated embodiments should be considered as illustrative only, and numerous other embodiments can be configured using the techniques disclosed herein, in a wide variety of different applications.

It should also be understood that the disclosed BIOS-based storage region protection techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for device protection using BIOS-based detection and mitigation of modifications to a protected storage region may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based storage region protection engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based storage region protection platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
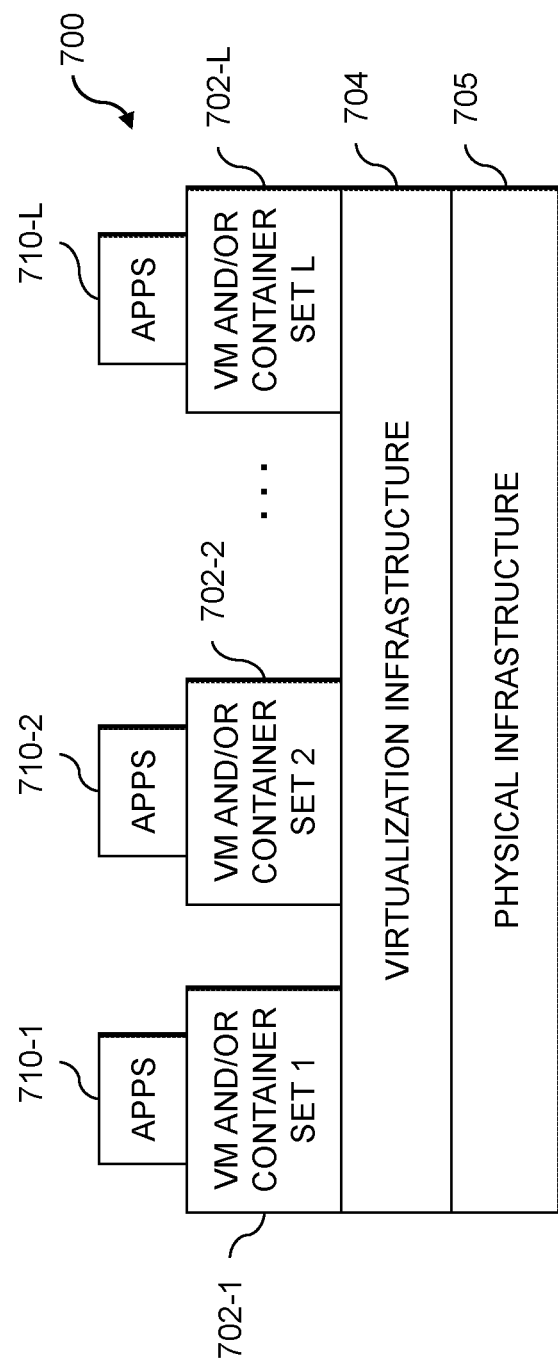
FIG. 7 illustrates an exemplary processing platform that may be used to implement at least a portion of one or more embodiments of the disclosure comprising a cloud infrastructure.

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide storage region protection functionality of the type described above for one or more processes running on a given one of the VMs. For example, each of the VMs can implement BIOS-based storage region protection control logic and associated mitigation functionality for one or more processes running on that particular VM.

An example of a hypervisor platform that may be used to implement a hypervisor within the virtualization infrastructure 704 is the VMware® vSphere® which may have an associated virtual infrastructure management system such as the VMware® vCenter™. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide storage region protection functionality of the type described above for one or more processes running on different ones of the containers. For example, a container host device supporting multiple containers of one or more container sets can implement one or more instances of BIOS-based storage region protection control logic and associated mitigation functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises at least a portion of the given system and includes a plurality of processing devices, denoted 802-1, 802-2, 802-3, ... 802-K, which communicate with one another over a network 804. The network 804 may comprise any type of network, such as a WAN, a LAN, a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an ASIC, an FPGA or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Figure 8:
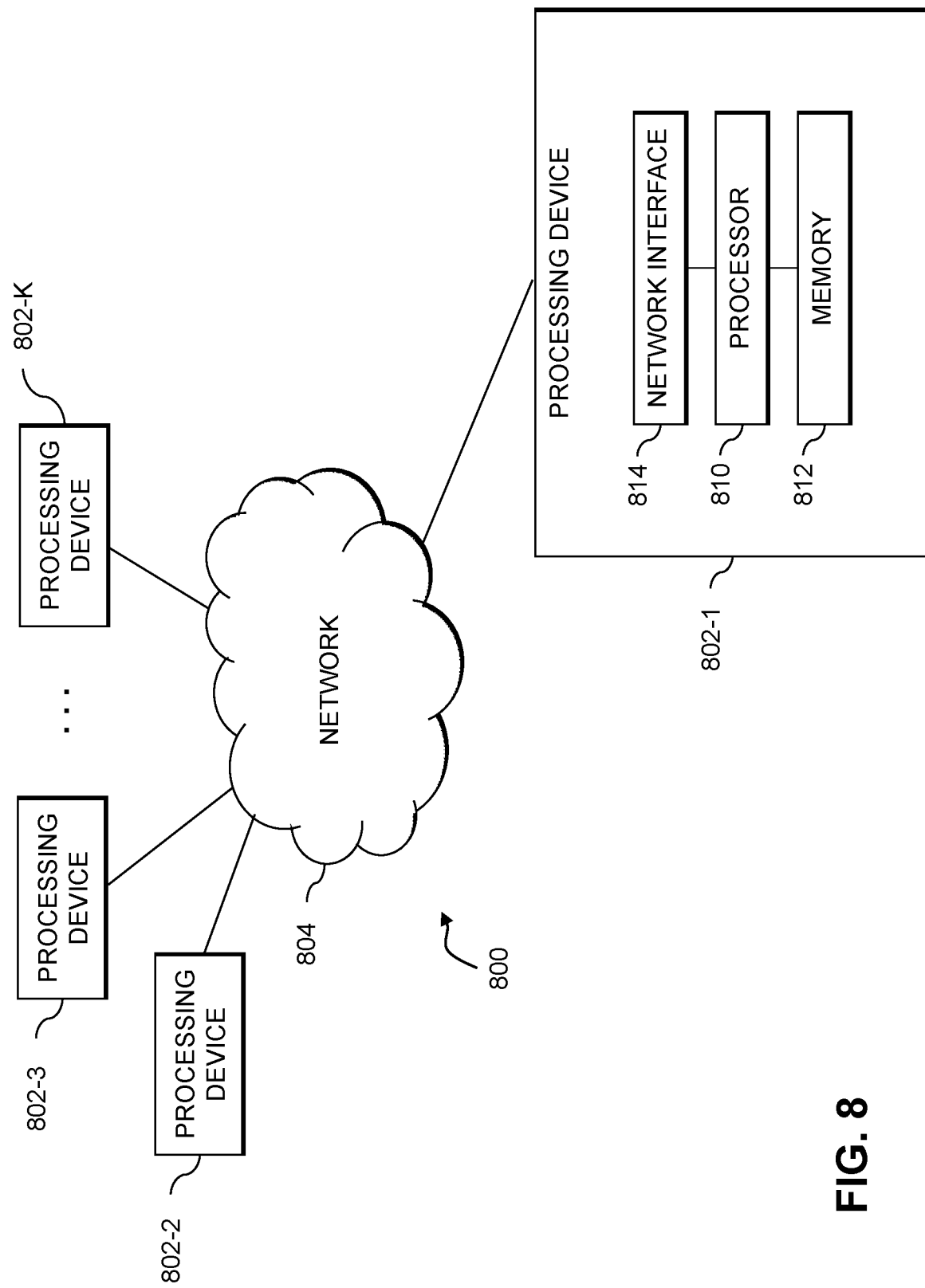
FIG. 8 illustrates another exemplary processing platform that may be used to implement at least a portion of one or more embodiments of the disclosure.

Multiple elements of an information processing system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining, by a basic input/output system (BIOS) of at least one processing device, during a first execution of a boot process, an indication of a protected storage region of at least one storage device associated with the at least one processing device;
storing, by the BIOS, during the first execution of the boot process, content of the protected storage region in a backup storage region of a persistent storage device associated with the BIOS;
comparing, by the BIOS, during a subsequent execution of the boot process, one or more of: (i) content of the protected storage region to the content of the backup storage region and (ii) a first hash value of the content of the protected storage region to a second hash value of the content of the backup storage region, to detect one or more changes in the content of the protected storage region; and
initiating at least one automated action responsive to the one or more detected changes in the content of the protected storage region, wherein the at least one automated action comprises notifying at least one user of the one or more detected changes in the content of the protected storage region;
wherein the method is performed by the at least one processing device, wherein the at least one processing device comprises a processor coupled to a memory.

2. The method of claim 1, wherein the at least one automated action further comprises restoring the content of the backup storage region to the protected storage region responsive to the at least one user indicating that the one or more detected changes in the content of the protected storage region were not approved.

3. The method of claim 2, wherein the at least one automated action further comprises allowing an operating system of the at least one processing device to load responsive to the at least one user indicating that the one or more detected changes in the content of the protected storage region were approved.

4. The method of claim 1, wherein the at least one automated action further comprises updating the content of the backup storage region with the content of the protected storage region responsive to the at least one user indicating that the one or more detected changes in the content of the protected storage region were approved.

5. The method of claim 4, wherein the at least one automated action further comprises allowing an operating system of the at least one processing device to load responsive to the updating of the content of the backup storage region with the content of the protected storage region.

6. The method of claim 1, wherein the protected storage region stores one or more of: boot metadata, filesystem metadata, operating system metadata, BIOS metadata and designated protected information.

7. The method of claim 1, wherein the persistent storage device associated with the BIOS is of the at least one processing device.

8. An apparatus comprising:
at least one processing device comprising a processor coupled to a memory;
the at least one processing device being configured to implement the following steps:
obtaining, by a basic input/output system (BIOS) of the at least one processing device, during a first execution of a boot process, an indication of a protected storage region of at least one storage device associated with the at least one processing device;
storing, by the BIOS, during the first execution of the boot process, content of the protected storage region in a backup storage region of a persistent storage device associated with the BIOS;
comparing, by the BIOS, during a subsequent execution of the boot process, one or more of: (i) content of the protected storage region to the content of the backup storage region and (ii) a first hash value of the content of the protected storage region to a second hash value of the content of the backup storage region, to detect one or more changes in the content of the protected storage region; and
initiating at least one automated action responsive to the one or more detected changes in the content of the protected storage region, wherein the at least one automated action comprises notifying at least one user of the one or more detected changes in the content of the protected storage region.

9. The apparatus of claim 8, wherein the at least one automated action further comprises restoring the content of the backup storage region to the protected storage region responsive to the at least one user indicating that the one or more detected changes in the content of the protected storage region were not approved.

10. The apparatus of claim 9, wherein the at least one automated action further comprises allowing an operating system of the at least one processing device to load responsive to the at least one user indicating that the one or more detected changes in the content of the protected storage region were approved.

11. The apparatus of claim 8, wherein the at least one automated action further comprises updating the content of the backup storage region with the content of the protected storage region responsive to the at least one user indicating that the one or more detected changes in the content of the protected storage region were approved.

12. The apparatus of claim 11, wherein the at least one automated action further comprises allowing an operating system of the at least one processing device to load responsive to the updating of the content of the backup storage region with the content of the protected storage region.

13. The apparatus of claim 8, wherein the protected storage region stores one or more of: boot metadata, filesystem metadata, operating system metadata, BIOS metadata and designated protected information.

14. The apparatus of claim 8, wherein the persistent storage device associated with the BIOS is of the at least one processing device.

15. A non-transitory processor-readable storage medium having stored therein program code of one or more software programs, wherein the program code when executed by at least one processing given device causes the at least one processing device to perform the following steps:
obtaining, by a basic input/output system (BIOS) of the at least one processing device, during a first execution of a boot process, an indication of a protected storage region of at least one storage device associated with the at least one processing device;
storing, by the BIOS, during the first execution of the boot process, content of the protected storage region in a backup storage region of a persistent storage device associated with the BIOS;
comparing, by the BIOS, during a subsequent execution of the boot process, one or more of: (i) content of the protected storage region to the content of the backup storage region and (ii) a first hash value of the content of the protected storage region to a second hash value of the content of the backup storage region, to detect one or more changes in the content of the protected storage region; and
initiating at least one automated action responsive to the one or more detected changes in the content of the protected storage region, wherein the at least one automated action comprises notifying at least one user of the one or more detected changes in the content of the protected storage region.

16. The non-transitory processor-readable storage medium of claim 15, wherein the at least one automated action further comprises restoring the content of the backup storage region to the protected storage region responsive to the at least one user indicating that the one or more detected changes in the content of the protected storage region were not approved.

17. The non-transitory processor-readable storage medium of claim 16, wherein the at least one automated action further comprises allowing an operating system of the at least one processing device to load responsive to the at least one user indicating that the one or more detected changes in the content of the protected storage region were approved.

18. The non-transitory processor-readable storage medium of claim 15, wherein the at least one automated action further comprises updating the content of the backup storage region with the content of the protected storage region responsive to the at least one user indicating that the one or more detected changes in the content of the protected storage region were approved, and wherein the at least one automated action further comprises allowing an operating system of the at least one processing device to load responsive to the updating of the content of the backup storage region with the content of the protected storage region.

19. The non-transitory processor-readable storage medium of claim 15, wherein the protected storage region stores one or more of: boot metadata, filesystem metadata, operating system metadata, BIOS metadata and designated protected information.

20. The non-transitory processor-readable storage medium of claim 15, wherein the persistent storage device associated with the BIOS is of the at least one processing device.

\* \* \* \* \*

UNITED STATES PATENT AND TRADEMARK OFFICE
CERTIFICATE OF CORRECTION

| | | |
|---|---|---|
| PATENT NO. | : 12,393,741 B2 | Page 1 of 1 |
| APPLICATION NO. | : 18/109603 | |
| DATED | : August 19, 2025 | |
| INVENTOR(S) | : Shachar et al. | |

It is certified that error appears in the above-identified patent and that said Letters Patent is hereby corrected as shown below:

In the Claims

Column 16, Line 13, Claim 15, replace "least one processing given device causes the at least one" with -- least one processing device causes the at least one --

Signed and Sealed this
Twenty-third Day of September, 2025

John A. Squires
*Director of the United States Patent and Trademark Office*